United States Patent [19]
Harmon

[11] 3,907,149
[45] Sept. 23, 1975

[54] PRESSURE VESSEL HAVING A SEALED PORT

[75] Inventor: Emerson R. Harmon, Lisbon, Wis.

[73] Assignee: Amalga Corporation, Menomonee Falls, Wis.

[22] Filed: Feb. 19, 1974

[21] Appl. No.: 443,336

Related U.S. Application Data

[63] Continuation of Ser. No. 192,098, Oct. 26, 1971, abandoned, which is a continuation-in-part of Ser. No. 852,624, Aug. 15, 1969, abandoned.

[52] U.S. Cl. .................................. 220/3; 220/63 R
[51] Int. Cl.² ...................... B65D 25/14; F17C 1/00
[58] Field of Search ....... 206/16; 222/183, 3; 220/3, 220/9 A, 9 LG, 10, 63; 169/1, 30, 31 R

[56] References Cited
UNITED STATES PATENTS

| | | |
|---|---|---|
| 2,821,257 | 1/1958 | Buckley ............................ 169/31 R |
| 3,073,475 | 1/1963 | Fingerhut................................ 220/3 |
| 3,132,761 | 5/1964 | Sylvester........................ 220/63 R X |
| 3,182,750 | 5/1965 | Gleason et al. ................ 220/63 R X |
| 3,557,827 | 1/1971 | Marsh.................................. 137/590 |

*Primary Examiner*—Robert B. Reeves
*Assistant Examiner*—Francis J. Bartuska
*Attorney, Agent, or Firm*—Andrus, Sceales, Starke & Sawall

[57] ABSTRACT

A reinforced pressure vessel lined with a flexible non-metallic material and having a sealed port in which a closure is threaded to an intermediate boss, and the liner is sealed by pressure or mechanically to the boss or to an unthreaded portion of the closure.

1 Claim, 8 Drawing Figures

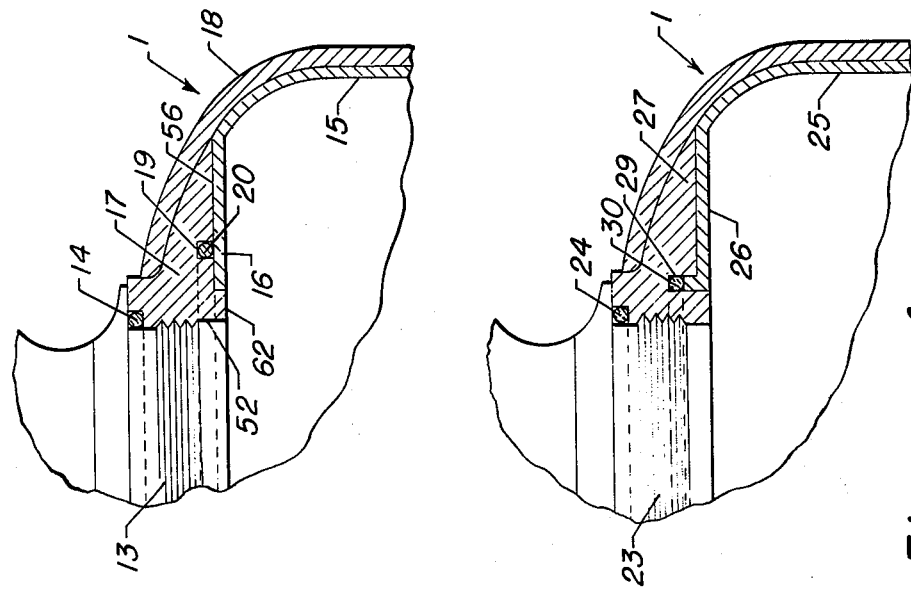
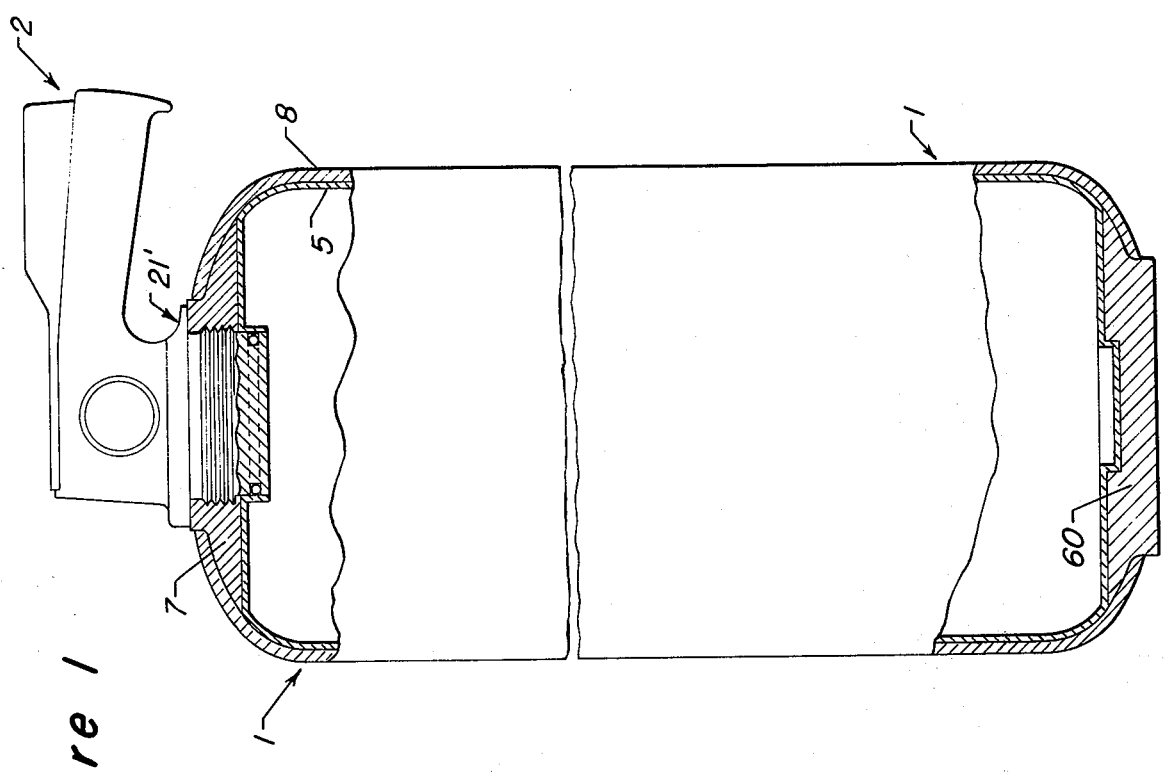

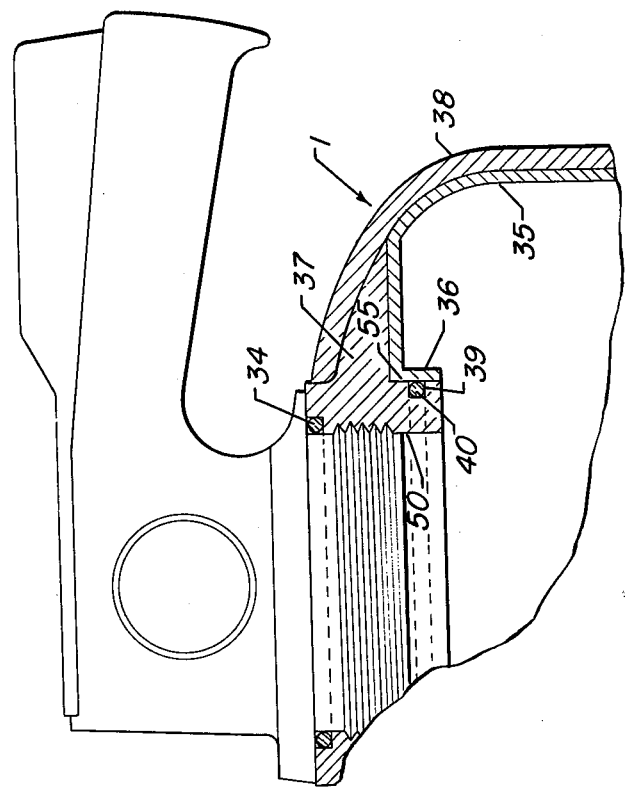
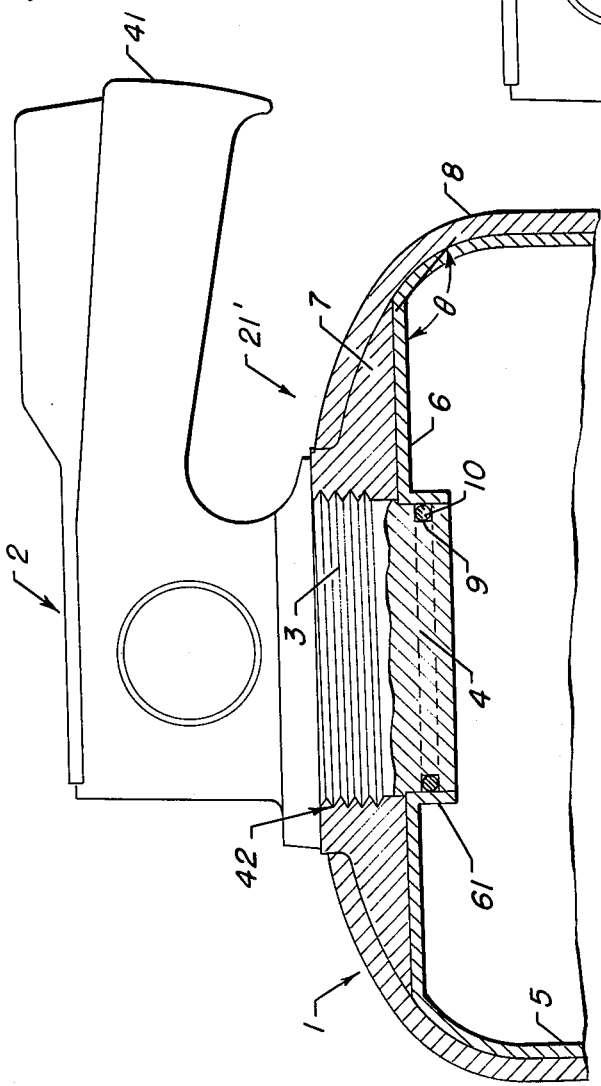

INVENTOR:
Emerson Ray Harmon

BY: James R. Hoatson, Jr.
Philip T. Liggett
ATTORNEYS

PRESSURE VESSEL HAVING A SEALED PORT

This is a continuation, of application Ser. No. 192,098, filed Oct. 26, 1971, now abandoned which is a continuation-in-part of application Ser. No. 852,624filed Aug. 15, 1969 now abandoned.

This invention relates to a glass reinforced composite pressure vessel lined with a non-metallic flexible material and having a sealed port. More particularly, a closure means is threaded to an intermediate boss, and the liner is sealed by pressure or mechanical means to the boss or to an unthreaded portion of the closure means.

Currently, pressure vessels with liners are most frequently used where the vessel is used to contain caustic or corrosive fluids under pressure. The liner is generally welded, molded, or bonded to the port fitting which become an integral part of the vessel during the manufacturing process. The liner and fitting attachment means in such an instance serves to protect the reinforced composite outer shell structure from the adverse effects or exposure of such fluids. Pressure vessels of this type find wide use as fire extinguishers, water softeners, oxygen cylinders, and in liquid storage vessels. In all of these devices it is extremely important that the lining material used is inert with respect to the fluids contained in the pressure vessel and thereby protects the reinforcing outer shell of the pressure vessel, and that the liner is sealed air tight so that there is no leakage of fluid from the pressure vessel.

Besides these basic requirements, pressure vessel liners are also called upon to withstand extremely adverse conditions, such as high and low temperatures and impacts. It is at extremely low temperatures that the conventional lined pressure vessels exhibit certain inferior qualities. It is a recommended standard in the hand fire extinguisher industry that the component parts of a fire extinguisher be manufactured to withstand impacts at temperatures of −40°F. At such temperatures the more commonly used liner materials, which are rigid at ambient temperatures, will shatter upon impact at such low temperatures.

To obviate the problem of low temperature brittleness, lined pressure vessels have been developed which utilize liners made of polyethylene, polytetrafluoroethylene, fluorinated ethylene propylene, nylon resins, or other plastics that are flexible at low temperatures. While withstanding extreme temperature ranges, certain disadvantages have been noted in using these materials. First, due to the flexibility of these materials, load transfer through threaded couplings is poor and very inefficient for most pressure applications. Also, bonding, welding or molding this material to other dissimilar materials for pressure sealing application is very poor. For this reason, it has heretofore been impractical to line a pressure vessel with a flexible material and still protect the reinforcing shell from corrosion or contact with the pressurized media. Using the unique sealing arrangement developed by this invention, the use of a flexible material as a liner for a pressure vessel is now practical, however.

The primary object of this invention is to produce a pressure vessel lined with a flexible material which protects a reinforcing shell from corrosion or exposure to the contained fluid.

It is another object to produce a lined pressure vessel in which the liner is sealed to a closure means by the pressure within the vessel without any locking inter-engagement between the closure means and the liner.

Further, this invention allows for dissimilar liner and boss fittings materials which require no seal between the two interfaces, in the form of bonding, molding or welding.

An additional object of an alternative form of this invention is a lined pressure vessel in which an intermediate boss assists in protecting the reinforcing shell. The boss in this instance is used to seal the port of the pressure vessel by forming a mechanical seal both with the flexible liner and with a closure device.

In a broad aspect this invention is a lined pressure vessel having a sealed port comprising: a glass reinforced composite outer shell having an aperture therein at said port; a flexible inner liner having a lip terminating in an opening at said port; a rigid annular boss having an internally threaded opening and having outer edges interposed between and in contact with said outer shell and said inner liner; a closure means threaded exteriorly and threadably engaged in said boss; and a sealing means at said lip of said inner liner, whereby pressure within said vessel tightly seals said port.

The pressure vessel described is often used as a fire extinguisher. In such a case, the closure means is a nozzle or valve assembly and the reinforcing outer shell is normally comprised of either epoxy or polyester resin impregnated fiberglass filaments would to surround the inner liner. The inner liner is normally comprised of a flexible plastic, such as polyethylene, fluorinated ethylene propylene or polytetrafluoroethylene.

There are several alternative embodiments to the unique sealing device of this invention. In the preferred embodiment, the closure means has a lower unthreaded portion that extends past the threaded boss into the interior of the pressure vessel. The lip of the inner liner forms a sleeve about this lower unthreaded portion of the closure means. About the lower unthreaded portion of the closure means, there is a groove, the depth of which extends radially toward the axis of the closure means. An O-ring is positioned in this groove and with the groove comprises the sealing means used in this invention. The lip of the inner liner forms a sleeve about the lower unthreaded portion of the closure means and is pressed tightly against the O-ring by a charge of pressure within the pressure vessel, thereby sealing the inner liner to the lower portion of the closure means and isolating the interior of the pressure vessel from the reinforced outer shell. In a modification of this embodiment, the closure means has an interior surface transverse with respect to said interiorally threaded opening in said boss, and there is a groove in this interior surface encircling the threaded opening in the boss. In this modification, the lip of the inner liner is in contact with the interior surface of the closure means instead of the boss. The lip covers the groove and there is an O-ring positioned in the groove, thereby sealing the lip of the inner liner to the interior surface of the closure means.

In an alternative arrangement, the boss has an interior surface with a groove therein encircling the threaded opening in the boss. This description applies whether the interior surface of the boss is transverse with respect to the interiorally threaded opening in the boss, or whether it is coaxial with respect to the interiorally threaded opening in the boss. The term coaxial, as used herein, means that the interior surface of the boss in which the groove is located has the same axis as the threaded opening in the boss. In either case, the groove encircles the threaded opening with the depth of the groove either radial or parallel with respect to the axis of the interiorally threaded opening. The inner liner, in both situations is in contact with the interior surface of the boss, and the lip of the inner liner covers the groove. An O-ring is positioned in the groove so that when the vessel is charged with pressure, the pressure within the vessel will force the lip of the flexible liner against the O-ring, thereby sealing the lip of the inner liner to the interior surface of the boss. Since the boss is sealed to the closure means by being in threaded engagement therewith, the port of the pressure vessel is sealed and the interior of the pressure vessel is separated from the outer reinforcing shell. In a slight modification of either of these alternate embodiments, the lip of the inner liner extends into the groove.

In all of the embodiments of this vessel heretofore described, a charge of pressure within the pressure vessel will force the lip of the flexible liner outward against a sealing means to seal the port of the vessel.

One very useful embodiment of this invention is a lined fire extinguisher having a sealed port comprising: a glass reinforced outer shell having an aperture therein at the port, a flexible inner liner having a lip terminating in an opening at the port, a rigid annular boss having an interiorally threaded opening and having outer edges interposed between and in contact with the outer shell and the liner, a nozzle, or valve assembly, threaded exteriorally and threadably engaged in the boss; and a sealing means at the lip of the inner liner, whereby pressure within the fire extinguisher tightly seals the port. A fire extinguisher of superior construction is formed when the reinforced outer shell is comprised of resin impregnated fiberglass filaments and the flexible liner is comprised of polyethylene. An excellent seal is formed when the valve assembly has a lower unthreaded portion that extends past the boss into the interior of the fire extinguisher, and there is a groove about the unthreaded lower portion of the valve assembly. An O-ring is positioned within this groove and the lip of the inner liner forms a sleeve about the lower unthreaded portion of the valve assembly, thereby contacting the O-ring. Pressure within the fire extinguisher seals the lip to the O-ring, thereby tightly sealing the port of the fire extinguisher. The movement of the lip under pressure is more pronounced and the resultant sealing of the port more secure when there is a slight shoulder formed where the lip joins the remaining portion of the inner liner. That is, the lip is joined at a distinct angle to the rest of the liner. This angle may be acute, but more frequently is obtuse in order to insure that when the vessel is charged with pressure, the lip of the liner will move towards the sealing means and not away from the sealing means. Such an undesirable effect could occur if prior to pressurizing the vessel, the lip of the liner was not in direct contact with the sealing means.

While the preferred embodiments of this invention employ an O-ring in a groove as a sealing means, other conventional sealing means are also effective. The alternative possibilities would include gaskets and adhesives, as well as other conventional sealing means which are capable of forming an airtight seal.

The various features of this invention are more clearly illustrated in the accompanying drawings in which:

FIG. 1 is an elevational view in partial section of a preferred embodiment of the pressure vessel of this invention.

FIG. 2 is an enlarged partial view of the preferred seal at the port of the pressure vessel of FIG. 1.

FIG. 3 is an alternative embodiment to that of FIG. 2.

FIG. 4 is a modified form of the embodiment of FIG. 3.

FIG. 5 is another alternative embodiment to that of FIG. 2.

Figure 7:
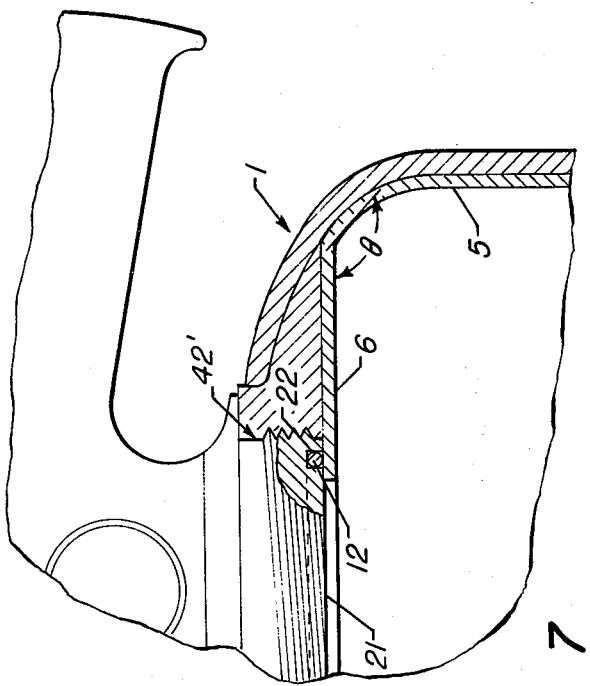
FIG. 7 is a modified form of the embodiment of FIG. 2.

Referring now to FIG. 1, there is shown a fire extinguisher 1 having a sealed port 21'. Fire extinguisher 1 is comprised of a reinforced outer shell 8, composed of fiberglass filaments set in a polyester resin and helically would about an inner polyethylene blowmolded liner 5. Interposed between the liner 5 and the reinforcing sheel 8 at the fire extinguisher port is a rigid annular boss 7 having an interiorally threaded opening therethrough. The outer edges of annular boss 7 are interposed between and in contact with outer shell 8 and inner liner 5. Similarly, a blind boss 60 is located at the end of the fire extinguisher opposite the fire extinguisher port. The outer edges of the blind boss 60 are interposed between and in contact with outer shell 8 and inner liner 5. Neither the inner liner 5 nor the outer shell 8 need be bonded to either annular boss 7 or blind boss 60, although, there is no adverse effect if there is an adhesive or other bond therebetween.

In the construction of this fire extinguisher, a polyethylene resin is molded in the form desired for the fire extinguisher liner. Thereafter the polyethylene plastic is cured and blind boss 60 and annular boss 7 are positioned against the ends of polyethylene liner 5. The mandrel holders of a filament winding machine are positioned against the boss 60 and the boss 7. The mandrel holders are rotated in unison, thereby rotating boss 60 and boss 7 and rotating inner liner 5. Fiberglass filaments impregnated with polyester resin are helically overwound about the inner liner 5, and about the outer edges of the boss 7 and the boss 60. The outer edges of the two bosses are thereby entrapped between the inner polyethylene liner 5 and the outer reinforcing shell 8 once the polyester resin in shell 8 has cured. This winding procedure is commonly used in the art of winding fiberglass filament wound pipes.

After the outer shell 8 has cured, a fire extinguisher valve assembly 2 is threadably engaged into the threaded hole of annular boss 7. The upper portion of valve assembly 2 is not sectioned in the drawings. In FIG. 2 it can be seen that the valve assembly 2 is comprised of a handle portion 41 as well as a closure means 42 extending into the fire extinguisher. Closure means 42 is comprised of an exteriorly threaded section 3 which is threadably engaged in boss 7. Below threaded section 3 is a lower unthreaded portion 4 that extends past the threaded boss 7 into the interior of fire extinguisher 1.

Inner polyethylene liner 5 has a lip 6 which terminates in an opening at the fire extinguisher port. This opening is of a smaller diameter than is the lower unthreaded portion 4 of closure means 42 of valve assembly 2. As valve assembly 2 is screwed into annular boss 7, the lip 6 is carried inward toward the interior of the fire extinguisher and thereby tends to form a sleeve 61 about the lower unthreaded portion 4 of closure means 42. Fire extinguisher 1 is equipped with a sealing means at the sleeve 61 formed by the lip 6. A groove 9 encircles and extends radially into the lower unthreaded portion 4 of closure means 42. Positioned within groove 9 is an O-ring 10. As the sleeve 61 covers part of the unthreaded portion 4 of closure means 42, a seal between the inside and the outside of the fire extinguisher is formed where O-ring 10 is in contact with sleeve 61. The inner liner 5 is thereby sealed to the lower portion 4 of the closure means 42. When fluid pressure is introduced into the interior of fire extinguisher 1 through valve assembly 2, a pressure is built up within the fire extinguisher interior, and lip 6 is forced outward into the contour formed by the junction of unthreaded portion 4 of closure means 42 and annular boss 7. The air displaced at this junction by lip 6 is forced outward and escapes between the threads of the threaded section 3 of closure means 42 and the interiorally threaded opening in annular boss 7. An extremely high pressure may be built up within the fire extinguisher since the polyethylene liner 5 is sealed to the closure means 41 by the seal formed between O-ring 10 and sleeve 61. It can be seen that any corrosive fluid introduced into the interior of the fire extinguisher through valve assembly 2 will not contact outer shell 8 nor will it contact annular boss 7. In this preferred arrangement only one O-ring is required to completely seal the interior of the fire extinguisher from its exterior surroundings.

One modification to the preferred sealing means illustrated in FIG. 2 is depicted in FIG. 7. In FIG. 7, the closure means 42' has an interior surface 21 transverse with respect to the interiorally threaded opening in boss 7. As illustrated, the interior surface 21 must be flush or nearly flush with the edge of annular boss 7 at the interiorally threaded opening in boss 7 since lip 6 must pass over this edge and still contact surface 21. There is a groove 22 in surface 21 encircling the threaded opening in the boss. The lip 6 of inner liner 5 is in contact with interior surface 21 of closure means 42' and covers groove 22. There is an O-ring 12 positioned in groove 22. Lip 6 is sealed against interior surface 21 of closure means 42 at the O-ring 12 when the pressure vessel is pressurized. In this modification, as in the embodiment of FIG. 2, only one O-ring is required to seal the interior of the fire extinguisher from the exterior. For this reason the annular boss 7 need not be constructed of corrosion resistant materials.

In both the sealing systems illustrated in FIGS. 2 and 7, the lip of the inner liner 6 is joined at a distinct angle to the rest of liner 5. Lip 6 extends from inner liner 5 at a distinct angle $\theta$. Such a juncture is useful in insuring that air does not become entrapped between the lip 6 and the boss 7 or between the lip 6 and the shell 8. The reason that a distinct angle is helpful at this junction of the lip 6 and the rest of the liner 5 is because this creates a shoulder which better follows the contour of the shell and the boss, thereby preventing entrappment of the air at the shoulder. When this type of junction between lip 6 and the rest of liner 5 is used, it is helpful if lip 6 is biased outward slightly from the vessel interior. In FIG. 2 the closure means 42 is screwed into annular boss 7 and the extremity of lip 6 is carried downward into the interior of the vessel, thereby forming a short sleeve 61. This decreases the angle $\theta$ and there is a tendency for lip 6 to spring outward and return to its original position at an angle $\theta$ with respect to the rest of liner 5. This tendency causes a weak seal to form at sleeve 61 which allows a pressure to be easily built up within the pressure vessel. When the pressure vessel is charged with a fluid under pressure, the length of this sleeve is increased and a strong seal is formed. The fluid under pressure will force the lip 6 outward against the surface of annular boss 7, and against the surface of the unthreaded portion of the closure means in such a way as to force entrapped air out of the port between the threads at the port as previously described.

In FIG. 7 the lip 6 is initially slightly biased away from the interior of the vessel. A weak seal is thereby formed between lip 6 and O-ring 12. This weak seal will allow the vessel to be easily pressurized, which will result in a much stronger seal between lip 6 and O-ring 12.

Various other embodiments of the sealing means are possible in the pressure vessel of this invention. In one example of a type of alternate embodiment, the annular boss has an interior surface with a groove therein encircling the threaded opening in the boss. The lip of the inner liner is in contact with the interior surface of the boss and covers the groove. An O-ring is positioned in the groove, thereby sealing the lip of the inner liner to the interior surface of the boss. Alternative forms of this embodiment are illustrated in FIGS. 3, 4, 5 and 6. In FIG. 3 there is an interior surface 56 of boss 17. Interior surface 56 is transverse with respect to the interiorally threaded opening 52 in boss 17. The depth of groove 19 therefore is parallel to the axis of the threaded opening 52 in boss 17. O-ring 20 is positioned within groove 19 and forms an effective seal between the lip 16 of inner liner 15 and the surface 56 of boss 17. In this embodiment, surfaces of boss 17 are exposed to fluid within the interior of the fire extinguisher, both at the opening 52 in boss 17 and at the surface 62. Because of the exposure, boss 17 must be chemically resistant to any fluid stored within the fire extinguisher. In addition, an extra seal is required to seal the interior of the fire extinguisher from the exterior. This seal is provided by an O-ring 14 in boss 17. This O-ring 14 seals the closure means 13 of the valve assembly to boss 17. It will be noted that the reinforcing shell 18 is not in contact with fluids contained within the fire extinguisher so that the reinforcing shell 18 is not subject to corrosion by such fluids.

The pressure vessel of FIG. 4 differs from that of FIG. 3 only in that the lip 26 of inner liner 25 extends upward into the groove 29 of annular boss 27. The O-ring 30 thereby forms a seal at the edge of lip 26, rather than the flat surface of lip 26. Again, a second O-ring 24 is required to seal the annular threaded section of the closure means 23 of the valve assembly 22 to annular boss 27.

The sealing arrangement illustrated in FIG. 5 also has a boss with an interior surface having a groove 39 therein which encircles the threaded opening in the boss. In this embodiment, lip 36 of inner liner 35 is in contact with the interior surface 55 of boss 37. Lip 36 covers groove 39 in the interior surface 55 of boss 37. An O-ring 40 is positioned in groove 39 and contacts lip 36, thereby sealing lip 36 to the interior surface 55 of boss 37. This embodiment differs from those of FIGS. 3 and 4, however, in that the interior surface 55 of boss 37 is concentric with respect to the axis of the interiorally threaded opening 50 in boss 37. The depth of groove 39, therefore, is radial with respect to this axis. An additional groove and O-ring 34 in boss 37 are necessary to effect a seal between the boss 37 and the closure means of the fire extinguisher to prevent fluid from leaking out of the pressure vessel.

Figure 6:
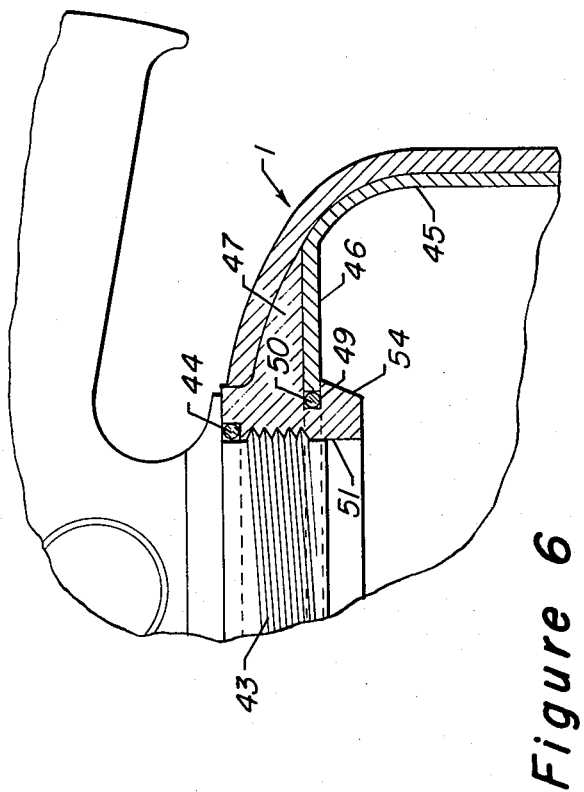
FIG. 6 is a modified form of the embodiment of FIG. 5.

The pressure vessel of FIG. 6 is only a slight modification of that of FIG. 5. In FIG. 6 the fire extinguisher is comprised of an inner liner 45 having a lip 46 which extends directly into the groove 49. Groove 49 is in a sloping surface 54 of annular boss 47. This sloping surface 54 is coaxial with respect to the interiorally threaded opening 51 in boss 47. That is, the truncated conical surface 54 has an axis identical to the axis of the opening 51 in boss 47. An O-ring 44 in an upper groove of annular boss 47 is necessary to seal the closure means 43 of the valve assembly of the fire extinguisher, thereby effecting a sealed port.

Figure 8:
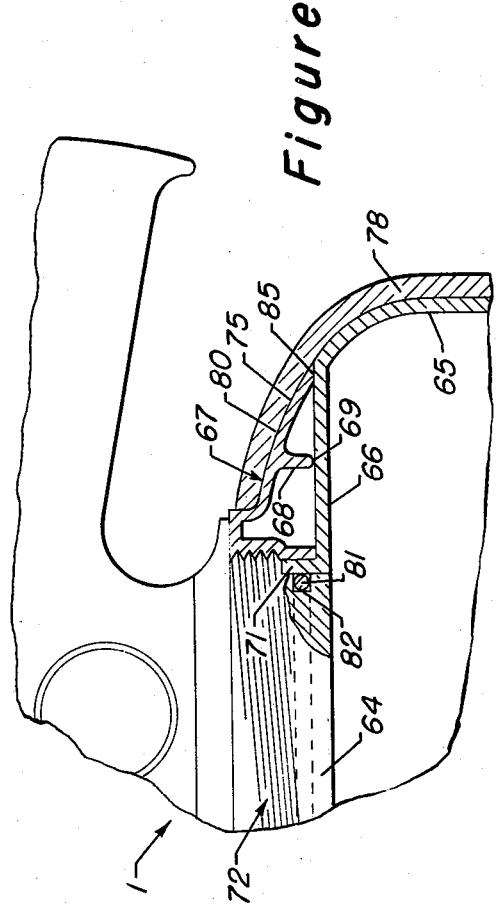
FIG. 8 is a modified form of the embodiment of FIG. 2.

The pressure vessel of FIG. 8 is similar to that of FIG. 2 but differs in several ways. In FIG. 8, as in the other embodiments, the fire extinguisher is comprised of an inner liner 65 having a lip 66 terminating in a sleeve 71 at the fire extinguisher port. Sleeve 71 extends out toward the port opening rather than in toward the interior of the fire extinguisher as is the case with sleeve 61 in FIG. 2. The diameter of the lower portion 64 of closure means 72 is accordingly smaller to accommodate sleeve 71. Also, lower portion 64 does not extend past the threaded boss 67 into the fire extinguisher interior, but extends only about as far into the fire extinguisher as does boss 67.

Boss 67 is of a slightly different construction than the other bosses depicted heretofore. Boss 67 has a threaded hole, but instead of being solid, has a contoured outer surface 75 with an inwardly extending annular flange 68. The edge 69 of flange 68 and the edge 85 of contoured outer surface 75 are in contact with inner liner 65 and the edge 80 of outer surface 75 is in contact with outer shell 78. Boss 67 thereby has outer edges interposed between and in contact with the outer shell 78 and the inner liner 65, but with a slightly different design than the other fire extinguishes depicted. The concave hollows formed between the parts of boss 67 and liner 65 assist in preventing distortion of boss 67 when the fire extinguisher undergoes rapid heating and cooling.

An O-ring 81 in a groove 82 in lower portion 64 of closure means 72 provides a seal between the closure means and the lip 66 or liner 65 at sleeve 71. Inner liner 65 is made of a material which, while flexible, is not so flexible that it is carried inward by lower portion 64 when closure means 72 is inserted into the fire extinguisher port.

In the preferred constructions of the pressure vessel of this invention, the outer shell is resin impregnated reinforced fiberglass and the inner liner is a flexible plastic. The flexible plastic, among other materials, may be polyethylene, or fluorinated ethylene propylene.

The foregoing detailed description of the several embodiments of the pressure vessel of this invention have been given for clearness of understanding only, and no unnecessary limitations should be construed therefrom as other modifications will be obvious to those skilled in the art.

Various modes of carrying out the invention are contemplated as being within the scope of the following claims particularly pointing out and distinctly claiming the subject matter which is regarded as the invention.

I claim:

1. A lined pressure vessel having a sealed port comprising, a resin impregnated fiberglass filament reinforced outer shell having an aperture therein at said port, a flexible inner liner having an annular lip extending outwardly within said port, a rigid annular boss having an interiorally threaded opening and having surfaces disposed between and in contact with the shell and liner at the sealed port and with the lower end of the boss free of threads and in engagement with the outside of the extending lip of said liner, said boss being solid along the outer surface and having concave hollows facing the liner of the vessel with at least one vertical flange on the inside of the boss extending toward the inside of the boss and into engagement with the liner to reinforce the boss, a valve assembly threaded exteriorally and threaded into said boss and having a lower unthreaded portion in engagement with the inside of the lip of said liner, and a sealing means comprising a groove about said lower unthreaded portion of said valve assembly and an O-ring positioned therein and in engagement with the outwardly extending lip of the liner, and pressure inside said pressure vessel seals the O-ring to said lip thereby tightly sealing said port, the engagement of the lower unthreaded portion of the valve assembly with the lip of the liner being inwardly of the O-ring to prevent any possibility of extrusion of the O-ring into the vessel.

* * * * *